US012629997B2

(12) United States Patent
Sakakibara et al.

(10) Patent No.: US 12,629,997 B2
(45) Date of Patent: May 19, 2026

(54) VEHICLE BATTERY AND SLIDING DOOR HINGE ARRANGEMENT

(71) Applicant: TOYOTA JIDOSHA KABUSHIKI KAISHA, Aichi-ken (JP)

(72) Inventors: Kosuke Sakakibara, Toyota (JP); Takaharu Tateishi, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 273 days.

(21) Appl. No.: 18/491,803

(22) Filed: Oct. 23, 2023

(65) Prior Publication Data

US 2024/0174059 A1 May 30, 2024

(30) Foreign Application Priority Data

Nov. 28, 2022 (JP) ................................. 2022-189594

(51) Int. Cl.
| | |
|---|---|
| *B60K 1/04* | (2019.01) |
| *B60J 5/06* | (2006.01) |
| *E05D 15/28* | (2006.01) |
| *H01M 50/249* | (2021.01) |
| *B62D 21/15* | (2006.01) |

(52) U.S. Cl.
CPC ................ *B60J 5/06* (2013.01); *E05D 15/28* (2013.01); *H01M 50/249* (2021.01); *B60K 1/04* (2013.01); *B60K 2001/0438* (2013.01); *B62D 21/157* (2013.01); *E05Y 2201/684* (2013.01); *E05Y 2201/688* (2013.01); *E05Y 2900/531* (2013.01); *H01M 2220/20* (2013.01)

(58) Field of Classification Search
CPC ..... B60K 1/04; B62S 21/157; B62D 25/2036; B62D 25/20; B60J 5/0412
See application file for complete search history.

(56) References Cited

U.S. PATENT DOCUMENTS

| | | | | |
|---|---|---|---|---|
| 11,851,110 | B2* | 12/2023 | Hirota | .................. B62D 27/026 |
| 2018/0050606 | A1* | 2/2018 | Sugitate | ................. B60K 11/06 |
| 2019/0382051 | A1 | 12/2019 | Toyota | |
| 2021/0197898 | A1 | 7/2021 | Toyota | |
| 2022/0305888 | A1* | 9/2022 | Ritz | ........................... B60J 5/06 |

FOREIGN PATENT DOCUMENTS

| | | |
|---|---|---|
| CN | 109278873 A | 1/2019 |
| JP | 2019-214314 A | 12/2019 |

* cited by examiner

*Primary Examiner* — Jason D Shanske
*Assistant Examiner* — James J Triggs
(74) *Attorney, Agent, or Firm* — HAUPTMAN HAM, LLP

(57) ABSTRACT

A vehicle side portion structure includes a battery case and a lower hinge. The battery case is disposed at a vehicle lower side of a floor panel of a vehicle. The lower hinge is provided at a lower portion of a sliding door that opens and closes a side portion of the vehicle. The lower hinge supports the sliding door to be slidable in the vehicle front-and-rear direction. In a state in which the sliding door is closed, at least a vehicle width direction inner side end portion of the lower hinge is disposed at a vehicle width direction outer side of the battery case in elevation view. In the closed state of the sliding door, the vehicle width direction inner side end portion is disposed at the same position in the vehicle front-and-rear direction as a vehicle width direction outer side end portion of the dividing member.

3 Claims, 6 Drawing Sheets

VEHICLE BATTERY AND SLIDING DOOR HINGE ARRANGEMENT

CROSS-REFERENCE TO RELATED APPLICATION

This application is based on and claims priority under 35 USC 119 from Japanese Patent Application No. 2022-189594 filed on Nov. 28, 2022, the disclosures of which are incorporated by reference herein.

BACKGROUND

Technical Field

The present disclosure relates to a vehicle side portion structure.

Related Art

A vehicle has been known since heretofore (for example, see Japanese Patent Application Laid-Open (JP-A) No. 2019-214314) in which a battery case accommodating a battery stack formed of plural battery cells is disposed at a vehicle lower side of a floor panel, and sliding doors are provided that open and close both of left and right side portions.

In this vehicle, a lower hinge is attached to a lower portion of each sliding door and supports the sliding door to be slidable in the vehicle front-and-rear direction. Each lower hinge is disposed at the vehicle upper side relative to the battery case.

However, in order to increase space inside the vehicle, in a state in which the sliding door is closed the lower hinge may be disposed at the vehicle width direction outer side of the battery case as seen in an elevation view. In this structure, at least a vehicle width direction inner side end portion of the lower hinge opposes a side portion of a periphery wall of the battery case. Consequently, if the vehicle has a side collision and the lower hinge is displaced to the vehicle width direction inner side, at least the vehicle width direction inner side end portion of the lower hinge may, via the battery case, interfere with (strike) the battery stack (the battery cells) accommodated in the battery case, and the battery stack (the battery cells) may be damaged.

SUMMARY

Accordingly, an object of the present invention is to provide a vehicle side portion structure that, when a lower hinge of a sliding door is disposed at a vehicle width direction outer side of a battery case in elevation view, may inhibit interference of the lower hinge with a battery stack accommodated inside the battery case at a time of side collision of the vehicle.

To achieve the object described above, a vehicle side portion structure according to a first aspect relating to the present disclosure includes: a battery case disposed at a vehicle lower side of a floor panel of a vehicle, the battery case accommodating a battery stack therein and including a dividing member that extends in a vehicle width direction: and a lower hinge provided at a lower portion of a sliding door that opens and closes a side portion of the vehicle, the lower hinge supporting the sliding door to be slidable in a vehicle front-and-rear direction, and in a state in which the sliding door is closed, at least a vehicle width direction inner side end portion of the lower hinge being disposed at a vehicle width direction outer side of the battery case in an elevation view, wherein, in the state in which the sliding door is closed, the vehicle width direction inner side end portion of the lower hinge is disposed at a same position in the vehicle front-and-rear direction as a vehicle width direction outer side end portion of the dividing member in a plan view.

According to the vehicle side portion structure of the first aspect, in the closed state of the sliding door, at least the vehicle width direction inner side end portion of the lower hinge of the sliding door is disposed at the vehicle width direction outer side of the battery case in elevation view, and in plan view at least the vehicle width direction inner side end portion of the lower hinge is disposed at the same position in the vehicle front-and-rear direction as the vehicle width direction outer side end portion of the dividing member that extends in the vehicle width direction inside the battery case. Therefore, when the vehicle has a side collision and the lower hinge of the sliding door displaces to the vehicle width direction inner side, the vehicle width direction inner side end portion of the lower hinge interferes with (strikes) the vehicle width direction outer side end portion of the dividing member. That is, the lower hinge (the vehicle width direction inner side end portion) of the sliding door is less likely to interfere with (is less likely to strike) the battery stack.

Thus, according to the present disclosure, even though the lower hinge (the vehicle width direction inner side end portion) of the sliding door is disposed at the vehicle width direction outer side of the battery case in elevation view, interference of the lower hinge (the vehicle width direction inner side end portion) with the battery stack accommodated inside the battery case at a time of side collision of the vehicle is inhibited. The meaning of the term "the same position" as used in the present disclosure is intended to include positions substantially the same that are a little offset in the vehicle front-and-rear direction from precisely the same position.

In a vehicle side portion structure according to a second aspect relating to the present disclosure, in the vehicle side portion structure according to the first aspect, in the state in which the sliding door is closed, a spacer is disposed between the vehicle width direction inner side end portion of the lower hinge and the battery case.

According to the vehicle side portion structure of the second aspect, in the closed state of the sliding door, the spacer is disposed between the vehicle width direction inner side end portion of the lower hinge and the battery case. Therefore, when the vehicle has a side collision and the lower hinge of the sliding door is displaced to the vehicle width direction inner side, a collision load is transmitted from the vehicle width direction inner side end portion of the lower hinge through the spacer to the vehicle width direction outer side end portion of the dividing member. That is, the collision load is less likely to be transmitted from the vehicle width direction inner side end portion of the lower hinge to the battery stack.

In a vehicle side portion structure according to a third aspect relating to the present disclosure, in the vehicle side portion structure according to the second aspect, a length in the vehicle front-and-rear direction of an outer side face of the spacer opposing the vehicle width direction inner side end portion of the lower hinge is longer than a length in the vehicle front-and-rear direction of an inner side face of the spacer opposing the battery case.

According to the vehicle side portion structure of the third aspect, the length of the outer side face of the spacer in the vehicle front-and-rear direction is longer than the length of the inner side face of the spacer in the vehicle front-and-rear direction. Therefore, even when the position of the vehicle width direction inner side end portion of the lower hinge is a little offset in the vehicle front-and-rear direction from the vehicle width direction outer side end portion of the dividing member, a collision load is transmitted from the vehicle width direction inner side end portion of the lower hinge through the spacer to the vehicle width direction outer side end portion of the dividing member. That is, the collision load is less likely to be transmitted from the vehicle width direction inner side end portion of the lower hinge to the battery stack.

As described above, according to the present disclosure, even though a lower hinge of a sliding door is disposed at a vehicle width direction outer side of a battery case in elevation view, interference of the lower hinge with a battery stack accommodated inside the battery case at a time of side collision of the vehicle may be inhibited.

BRIEF DESCRIPTION OF THE DRAWINGS

An exemplary embodiment of the present disclosure will be described in detail based on the following figures, wherein.

DETAILED DESCRIPTION

Figure 1:
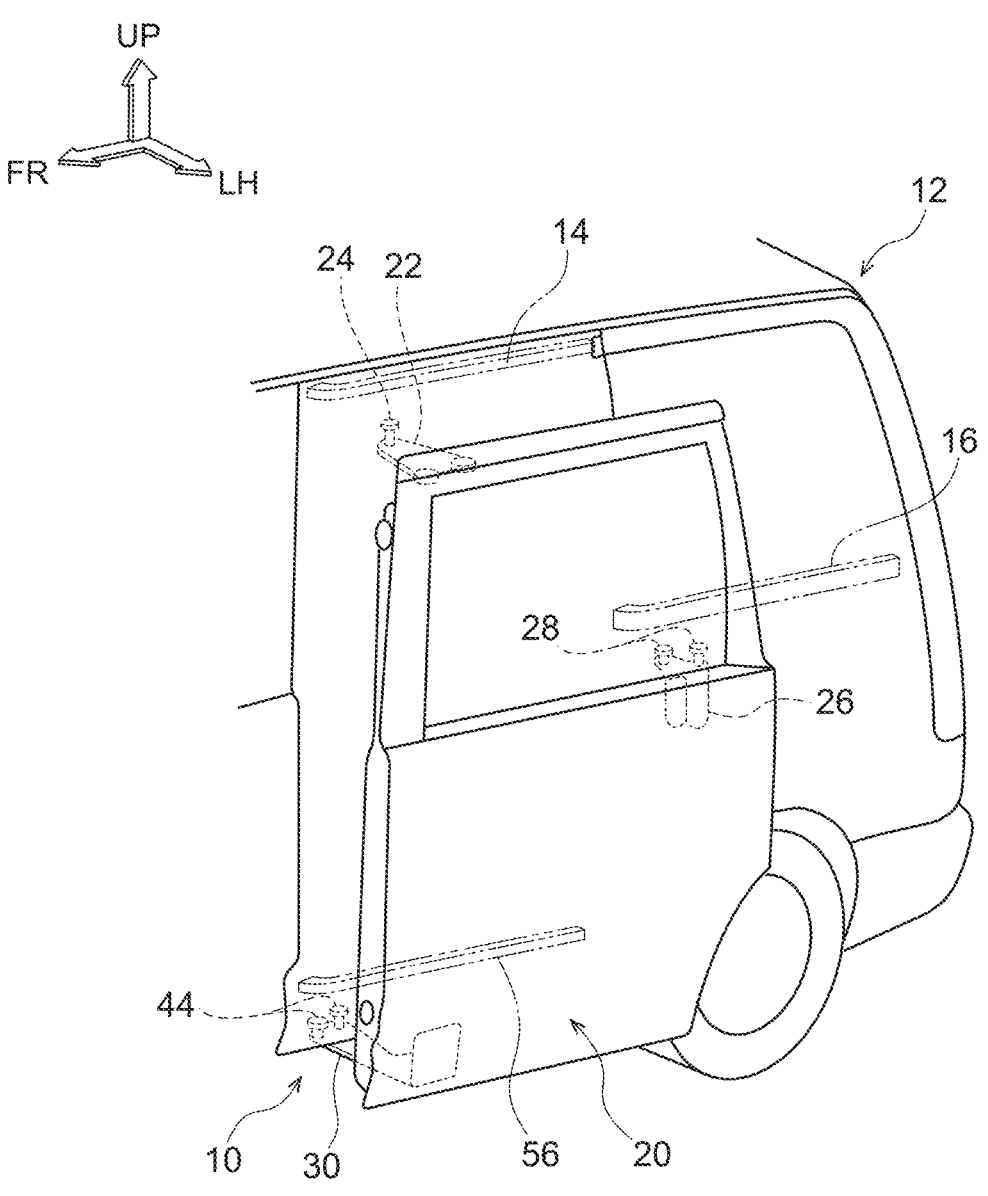
FIG. 1 is a schematic perspective view showing a side portion of a vehicle equipped with a vehicle side portion structure according to the present exemplary embodiment.

Below, an exemplary embodiment relating to the present disclosure is described in detail in accordance with the drawings. For convenience of description, the arrow UP that is shown where appropriate in the drawings indicates a vehicle upper direction, the arrow FR indicates a vehicle front direction, the arrow LH indicates a vehicle left direction, and the arrow RH indicates the vehicle right direction. Where the directions upper, lower, front, rear, left and right are used below without being particularly specified, the same represent upper, lower, front, rear, left and right of the vehicle. The left-and-right direction is the same as the vehicle width direction.

As shown in FIG. 1, a vehicle 12 is equipped with a vehicle side portion structure 10 according to the present exemplary embodiment. The vehicle 12 includes a sliding door 20 that opens and closes a side portion of the vehicle 12. The sliding door 20 is slidably provided at both of left and right side portions of the vehicle 12. Each sliding door 20 is structured to be capable of opening and closing a doorway (a vehicle cabin) through which vehicle occupants board and leave a rear seat of the vehicle 12.

An upper guide portion 14, a center guide portion 16 and a lower guide portion 56 are provided at the vehicle 12. The upper guide portion 14 is provided at an upper portion of the vehicle 12 and extends in the front-and-rear direction. The center guide portion 16 is provided at a vertical direction substantially central portion of the vehicle 12 and extends in the front-and-rear direction. The lower guide portion 56, which is described in more detail below, is provided at a lower portion of the vehicle 12 and extends in the front-and-rear direction.

An upper hinge 22 is attached to an upper portion of the sliding door 20. A guide roller 24 that is provided at the upper hinge 22 engages with the upper guide portion 14. A center hinge 26 is attached to a vertical direction substantially central portion of the sliding door 20. Guide rollers 28 that are provided at the center hinge 26 engage with the center guide portion 16. A lower hinge 30 is attached to a lower portion of the sliding door 20. Guide rollers 44 that are provided at the lower hinge 30 engage with the lower guide portion 56.

Thus, the sliding door 20 is supported to be movable in the front-and-rear direction relative to the vehicle 12. In FIG. 1, the respective guide portions and guide rollers are depicted as being separated to facilitate description, but in actuality the guide rollers are inserted into the guide portions. The sliding door 20 includes a door outer panel 20A at the vehicle width direction outer side and a door inner panel 20B at the vehicle width direction inner side. Periphery edge portions of the door outer panel 20A and door inner panel 20B are joined together by hemming (see FIG. 2).

Figure 2:
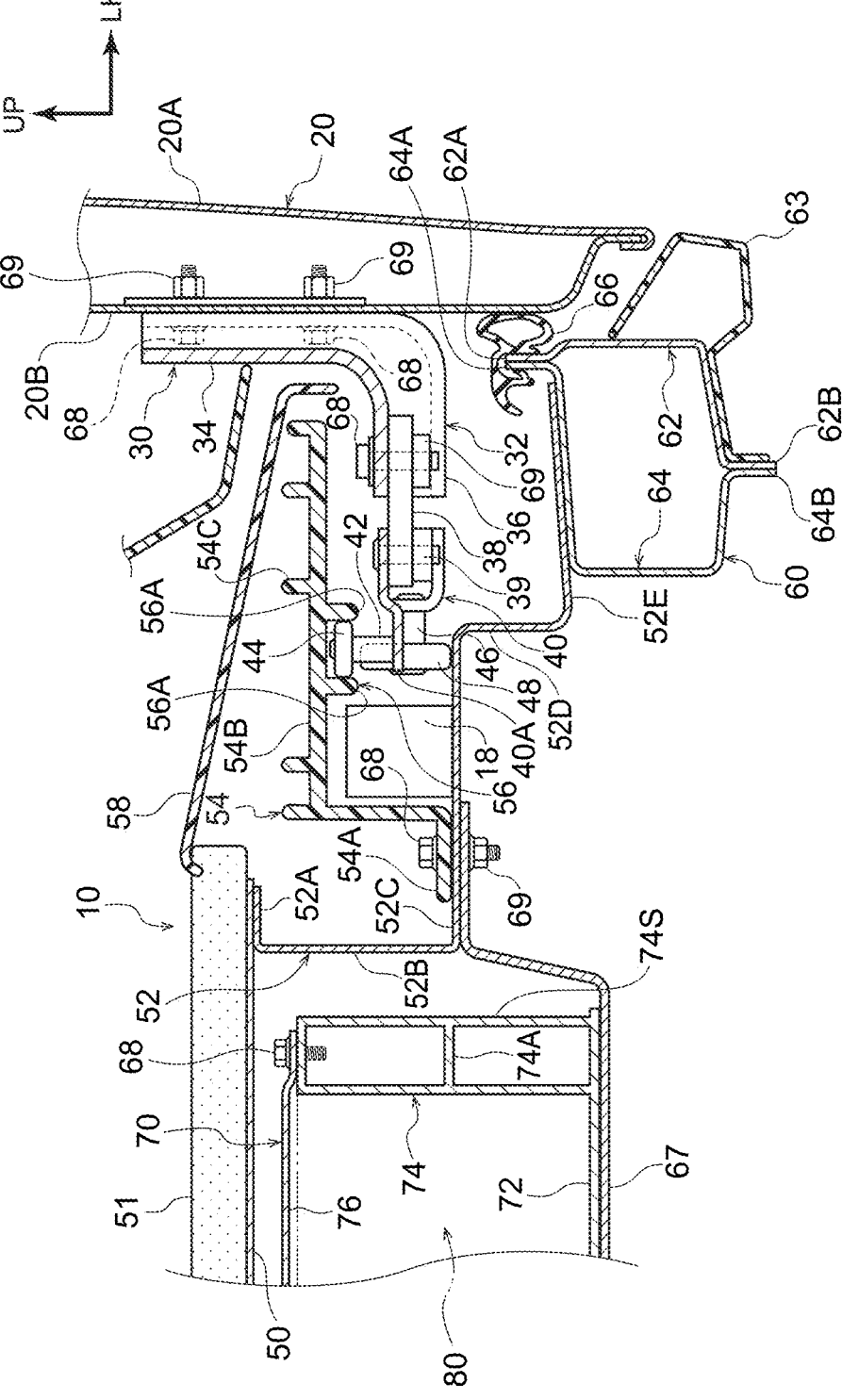
FIG. 2 is a schematic elevation view showing a magnification of a partial cross section of the vehicle side portion structure according to the present exemplary embodiment.

As shown in FIG. 2, the lower hinge 30 is attached to the lower portion of the sliding door 20. The lower hinge 30 includes a hinge main body 32 that is formed substantially in an "L" shape in an elevation view seen in the front-and-rear direction (below simply "in elevation view"). The hinge main body 32 includes a fixed portion 34 and a base support portion 36. The fixed portion 34 extends in a vertical direction along the door inner panel 20B. The base support portion 36 extends integrally to the vehicle width direction inner side from a lower end portion of the fixed portion 34.

The fixed portion 34 is formed substantially in a hat shape in cross section that is open to the vehicle width direction outer side. The fixed portion 34 is fastened by bolts 68 and nuts 69 and fixed to a side face of the door inner panel 20B that faces to the vehicle width direction inner side. The base support portion 36 is formed substantially in a hat shape in cross section that is open to the lower side. The base support portion 36 extends as far as the lower side of a vehicle width direction outer side end portion of a step 54, which is described below.

One end portion of a coupling member 38 is fixed to a vehicle width direction inner side end portion of the base support portion 36 by the bolts 68 and nuts 69. The coupling member 38 is a substantially flat plate-shaped member that extends in the vehicle width direction with the plate thickness direction in the vertical direction. A base portion 40 is attached to another end portion of the coupling member 38 by a pin 39. The base portion 40 is attached to be capable of swinging about an axis direction that is in the vertical direction.

The base portion 40 extends to the vehicle width direction inner side from the coupling member 38. A pair of shaft portions 42 are provided at an upper face of a vehicle width direction inner side end portion 40A of the base portion 40. Axial directions of the shaft portions 42 are in the vertical direction. The respective guide rollers 44 are rotatably attached to upper end portions of the shaft portions 42. The guide rollers 44 are inserted between a pair of guide plates 56A that structure the lower guide portion 56.

A shaft portion 46 whose axial direction is in the left-and-right direction is provided at the base portion 40. A load roller 48 is rotatably attached to a vehicle width direction inner side end portion of the shaft portion 46. The load roller 48 is in contact with a step under panel 52, which is described below. Thus, a structure is formed in which the lower hinge 30 is supported at the step under panel 52 via the load roller 48.

The vehicle 12 is also equipped with a floor panel 50 that structures a floor surface of the vehicle cabin. The floor panel 50 extends in the vehicle width direction and the front-and-rear direction with a plate thickness direction in the vertical direction. A floor carpet 51 is laid on an upper face of the floor panel 50. The step under panel 52 is provided between the floor panel 50 and a rocker 60, which is described below.

In other words, the floor panel 50 and the rocker 60 are coupled by the step under panel 52. An upper end portion of the step under panel 52 is formed as an upper flange portion 52A, which is inflected along a lower face of the floor panel 50. The upper flange portion 52A is superposed with and joined to the lower face of the floor panel 50 by welding or the like.

The step under panel 52 further includes a first vertical wall portion 52B, a first horizontal wall portion 52C, a second vertical wall portion 52D and a second horizontal wall portion 52E. In elevation view, the first vertical wall portion 52B integrally extends to the lower side from the upper flange portion 52A. The first horizontal wall portion 52C inflects and integrally extends to the vehicle width direction outer side from a lower end portion of the first vertical wall portion 52B. The second vertical wall portion 52D integrally extends to the lower side from a vehicle width direction outer side end portion of the first horizontal wall portion 52C. The second horizontal wall portion 52E inflects and integrally extends to the vehicle width direction outer side from a lower end portion of the second vertical wall portion 52D. The second horizontal wall portion 52E is superposed with a rocker inner panel 64, which is described below, from the upper side thereof and the second horizontal wall portion 52E is joined to the rocker inner panel 64 by welding or the like.

The step 54 is attached to the first horizontal wall portion 52C of the step under panel 52. The step 54 is fabricated of resin and is for vehicle occupants to use when boarding and leaving. The step 54 is formed substantially in an "L" shape in elevation view. A lower end portion of the step 54 is formed as a fixed portion 54A that is inflected along the first horizontal wall portion 52C. The fixed portion 54A is fastened by the bolts 68 and nuts 69 and fixed to the first horizontal wall portion 52C.

The step 54 extends to the upper side from the fixed portion 54A and hence extends to the vehicle width direction outer side. A step main body 54B extends in the vehicle width direction, and ribs 54C for reinforcement are provided at the step main body 54B. The ribs 54C extend in the front-and-rear direction. A plural number of the ribs 54C (five in the structure shown in the drawings) are provided. Each of the ribs 54C integrally protrudes to the upper side from the step main body 54B.

The lower guide portion 56 is formed at a lower face side of the step main body 54B. The lower guide portion 56 includes a left and right pair of the guide plates 56A, which integrally protrude to the lower side from the step main body 54B. The pair of guide plates 56A extend in the front-and-rear direction along the step main body 54B. The guide rollers 44 of the lower hinge 30 are inserted between the pair of guide plates 56A. Thus, the lower guide portion 56 is formed so as to guide the lower hinge 30 allowing movement in the front-and-rear direction.

A scuff plate 58 fabricated of resin is provided at the upper side of the step 54. The scuff plate 58 extends from a vehicle width direction outer side end portion of the floor panel 50 to a vehicle width direction outer side end portion of the step main body 54B. The scuff plate 58 is attached to the step 54 by clips or the like, which are not shown in the drawings. An opening and closing apparatus 18 of the sliding door 20 is also attached to the step 54. The opening and closing apparatus 18 is disposed at the upper face of the first horizontal wall portion 52C and includes components such as a motor, pulley and the like that are required for automatic opening and closing of the sliding door 20.

The rocker 60 is provided at the lower side of the lower hinge 30, at the vehicle width direction outer side of a battery case 70 which is described below. The rocker 60 is formed as a chamber in cross section and extends in the front-and-rear direction. The rocker 60) includes a rocker outer panel 62 disposed at the vehicle width direction outer side and the rocker inner panel 64 disposed at the vehicle width direction inner side.

The rocker outer panel 62 is formed substantially in a crank shape in elevation view: More specifically, from an upper crank portion 62A at an upper end portion, the rocker outer panel 62 extends to the lower side, a lower portion of the rocker outer panel 62 is inflected to the vehicle width direction inner side, and from a vehicle width direction inner side end portion thereof, a lower crank portion 62B extends to the lower side.

In elevation view, the rocker inner panel 64 is formed substantially in a hat shape that is open to the vehicle width direction outer side. More specifically, an upper flange portion 64A is formed at an upper end portion of the rocker inner panel 64. The upper flange portion 64A is superposed with the upper crank portion 62A of the rocker outer panel 62 and joined by welding or the like. A lower flange portion 64B is formed at a lower end portion of the rocker inner panel 64. The lower flange portion 64B is superposed with the lower crank portion 62B of the rocker outer panel 62 and joined by welding or the like. Thus, the rocker 60 is formed in a chamber structure.

A weatherstrip 66 is attached to the upper crank portion 62A and upper flange portion 64A that are joined to one another. The weatherstrip 66 forms a structure that seals a gap with the sliding door 20. A rocker molding 63 is attached to the vehicle width direction outer side of the rocker outer panel 62 by clips or the like, which are not shown in the drawings. The rocker molding 63 is fabricated of resin and is formed so as to cover a lower portion of the rocker outer panel 62 from the vehicle width direction outer side thereof.

The battery case 70 is disposed at the vehicle width direction inner side of the rocker 60) and the base portion 40 of the lower hinge 30, at the lower side of the floor panel 50. The battery case 70 is fabricated of metal and extends across substantially the whole region of the floor panel 50 in plan view. The battery case 70 is supported by side members, cross members and the like, which are not shown in the drawings.

The battery case 70 includes a bottom wall 72, a periphery wall 74 and a cap wall 76. A battery stack 80 formed of plural battery cells (see FIG. 3) is accommodated inside the battery case 70 with a wire harness, a cooling apparatus (neither of which is shown in the drawings) and so forth. Structures are formed to enable the supply of electric power from the battery stack 80 to an electric motor, which is not shown in the drawings.

The bottom wall 72 of the battery case 70 is formed in a substantially rectangular shape in plan view with a plate thickness direction in the vertical direction. The periphery wall 74 is provided standing integrally from outer periphery portions of the bottom wall 72. That is, the periphery wall 74 is formed in a substantially rectangular frame shape along the outer periphery edge portions of the bottom wall 72. The cap wall 76 is formed in a substantially rectangular shape so as to correspond with the outer shapes of the bottom wall 72 and periphery wall 74, with a plate thickness direction in the vertical direction. Outer periphery edge portions of the cap wall 76 are fastened to upper faces of the periphery wall 74 by the bolts 68.

Left and right side portions 74S are disposed at the vehicle width direction outer sides of the periphery wall 74. Each side portion 74S is formed as a chamber in elevation view and is divided into two chambers, upper and lower, by a dividing wall 74A in a flat plate shape. The dividing wall 74A is integrally provided at a vertical direction substantially central portion of the periphery wall 74. An under cover 67 is provided at the lower side of the battery case 70. Each of two vehicle width direction end portions of the under cover 67 is fastened to the step under panel 52, together with the step 54, by the bolts 68 and nuts 69.

As shown in FIG. 2, in the state in which the sliding door 20 is closed, the base support portion 36 and base portion 40 (the vehicle width direction inner side end portion 40A) of the lower hinge 30 are disposed at the vehicle width direction outer side of the battery case 70 in elevation view. That is, in the closed state of the sliding door 20, in a side view seen in the vehicle width direction (below simply "in side view"), the base support portion 36 and base portion 40 (the vehicle width direction inner side end portion 40A) of the lower hinge 30 are disposed at positions that overlap with the side portion 74S of the battery case 70 that faces to the vehicle width direction outer side.

Figure 3:
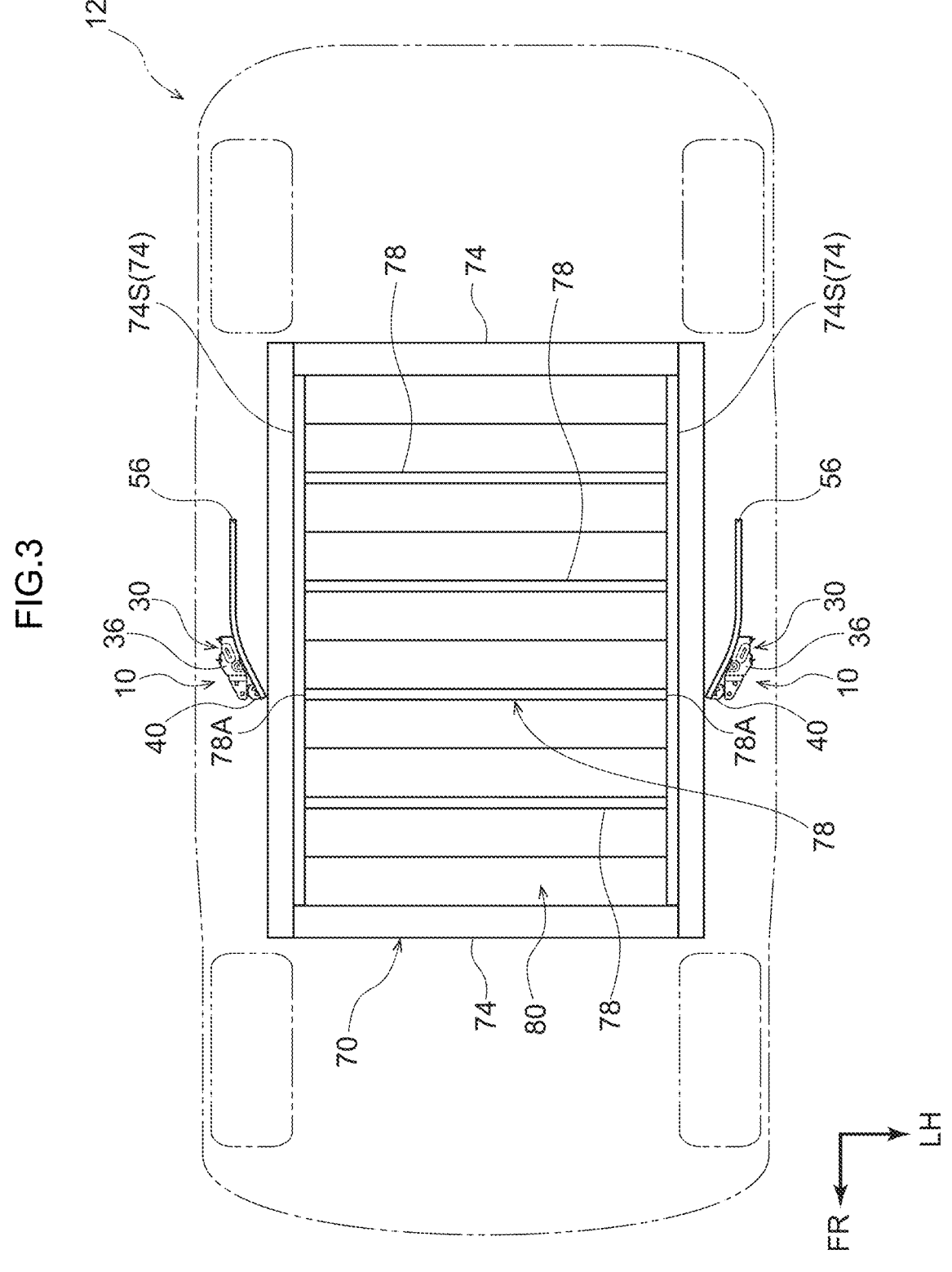
FIG. 3 is a schematic plan view showing the vehicle framework structure according to the present exemplary embodiment.

As shown in FIG. 3, a plural number (four in the structure in the drawings) of dividing members 78 are provided inside the battery case 70. The dividing members 78 extend in the vehicle width direction and connect the left and right side portions 74S. The dividing members 78 divide the interior of the battery case 70 into plural partitions that are arrayed in the front-and-rear direction. Each dividing member 78 is formed in a chamber shape (a flattened rectangular tube shape with a longer direction in the vertical direction in side view) and is assured of a degree of strength with respect to loads applied in the vehicle width direction.

Figure 4:
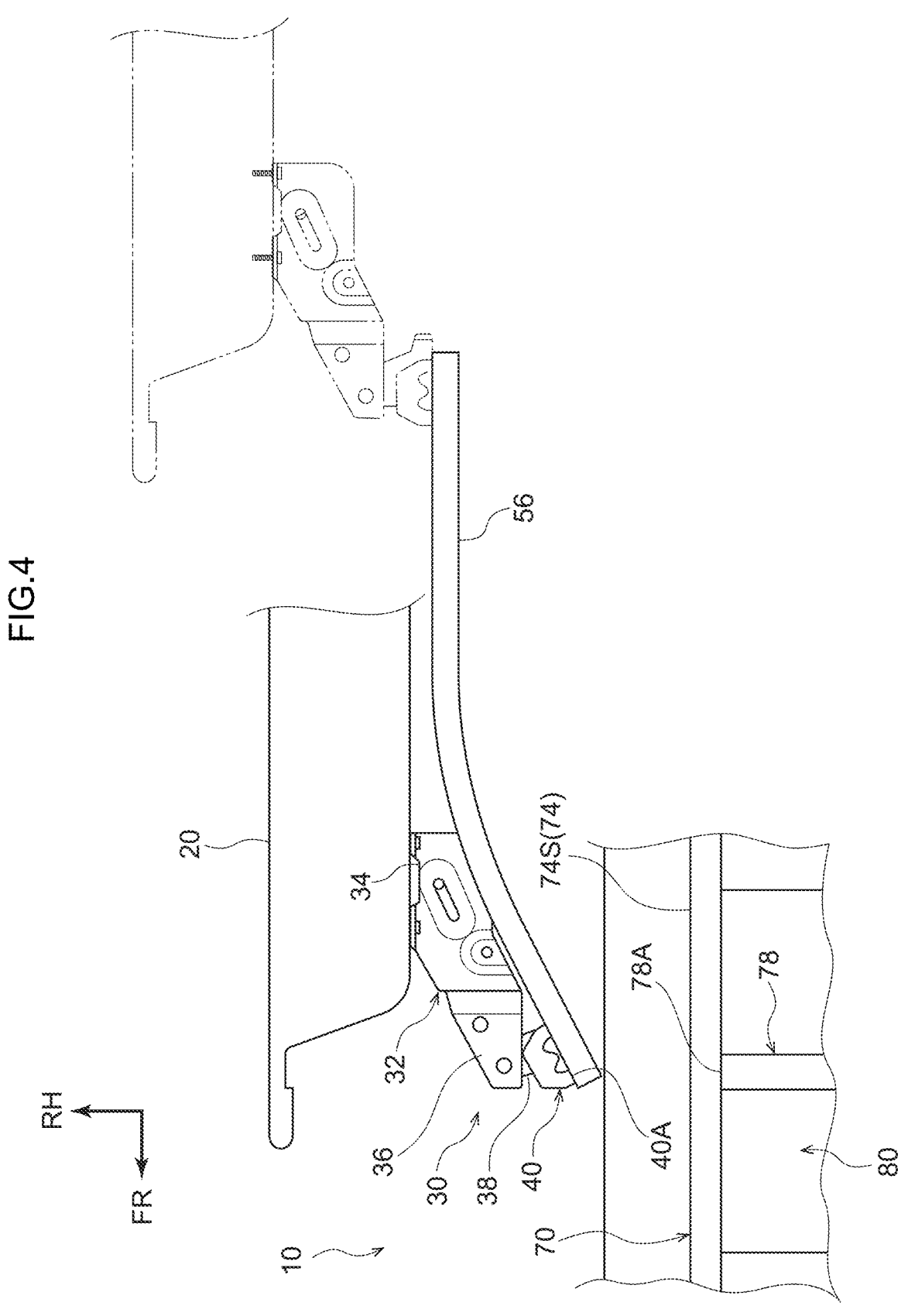
FIG. 4 is a schematic plan view showing a magnification of a portion of the vehicle side portion structure according to the present exemplary embodiment.

In the closed state of the sliding door 20, at least the vehicle width direction inner side end portion 40A of the base portion 40 of the lower hinge 30, which is disposed at the vehicle width direction outer side of the battery case 70 in elevation view, is disposed at substantially the same position in the front-and-rear direction as a vehicle width direction outer side end portion 78A of one of the dividing members 78 in plan view, as illustrated in FIG. 4 and FIG. 3. In other words, at least the vehicle width direction inner side end portion 40A of the base portion 40 of the lower hinge 30 opposes the vehicle width direction outer side end portion 78A of the one dividing member 78 in the vehicle width direction.

Now, operation of the vehicle side portion structure 10 according to the exemplary embodiment structured as described above is described.

As described above, in the closed state of the sliding door 20 of the vehicle 12 according to the present exemplary embodiment, the base support portion 36 and base portion 40 (the vehicle width direction inner side end portion 40A) of the lower hinge 30 are disposed at the vehicle width direction outer side of the battery case 70 in elevation view (disposed at positions that overlap with the side portion 74S of the battery case 70 in side view). Hence, if the vehicle 12 has a side collision, the base support portion 36 and base portion 40 (the vehicle width direction inner side end portion 40A) of the lower hinge 30 displace to the vehicle width direction inner side.

In the closed state of the sliding door 20, at least the vehicle width direction inner side end portion 40A of the base portion 40 of the lower hinge 30 is disposed at substantially the same position in the front-and-rear direction as the vehicle width direction outer side end portion 78A of the one of the dividing members 78 that extends in the vehicle width direction inside the battery case 70 (the vehicle width direction inner side end portion 40A opposes the vehicle width direction outer side end portion 78A of the one dividing member 78 in the vehicle width direction). Therefore, when the vehicle width direction inner side end portion 40A of the base portion 40 is displaced to the vehicle width direction inner side, the vehicle width direction inner side end portion 40A interferes with (strikes) the vehicle width direction outer side end portion 78A of the dividing member 78).

That is, the vehicle width direction inner side end portion 40A of the base portion 40 that is displaced to the vehicle width direction inner side is less likely to interfere with (less likely to strike) the battery stack 80 (the battery cells). Thus, according to the present exemplary embodiment, even though the base support portion 36 and base portion 40 (the vehicle width direction inner side end portion 40A) of the lower hinge 30 are disposed at the vehicle width direction outer side of the battery case 70 in elevation view, interference of the vehicle width direction inner side end portion 40A of the base portion 40 of the lower hinge 30 with the battery stack 80 (the battery cells) accommodated inside the battery case 70 may be inhibited.

Variant Example

Figure 5:
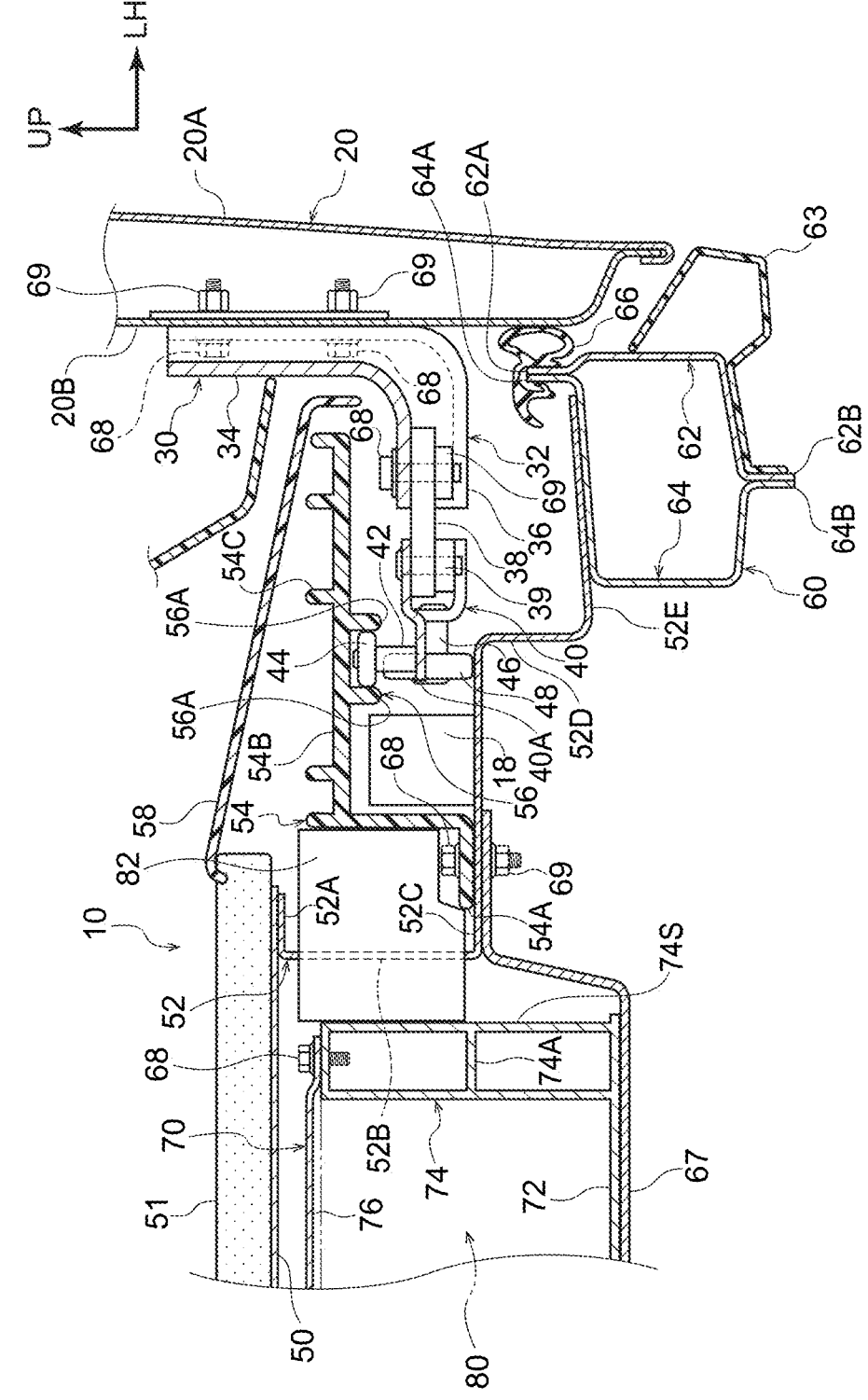
FIG. 5 is a schematic elevation view showing a magnification of a portion of a variant example of the vehicle side portion structure according to the present exemplary embodiment.
Figure 6:
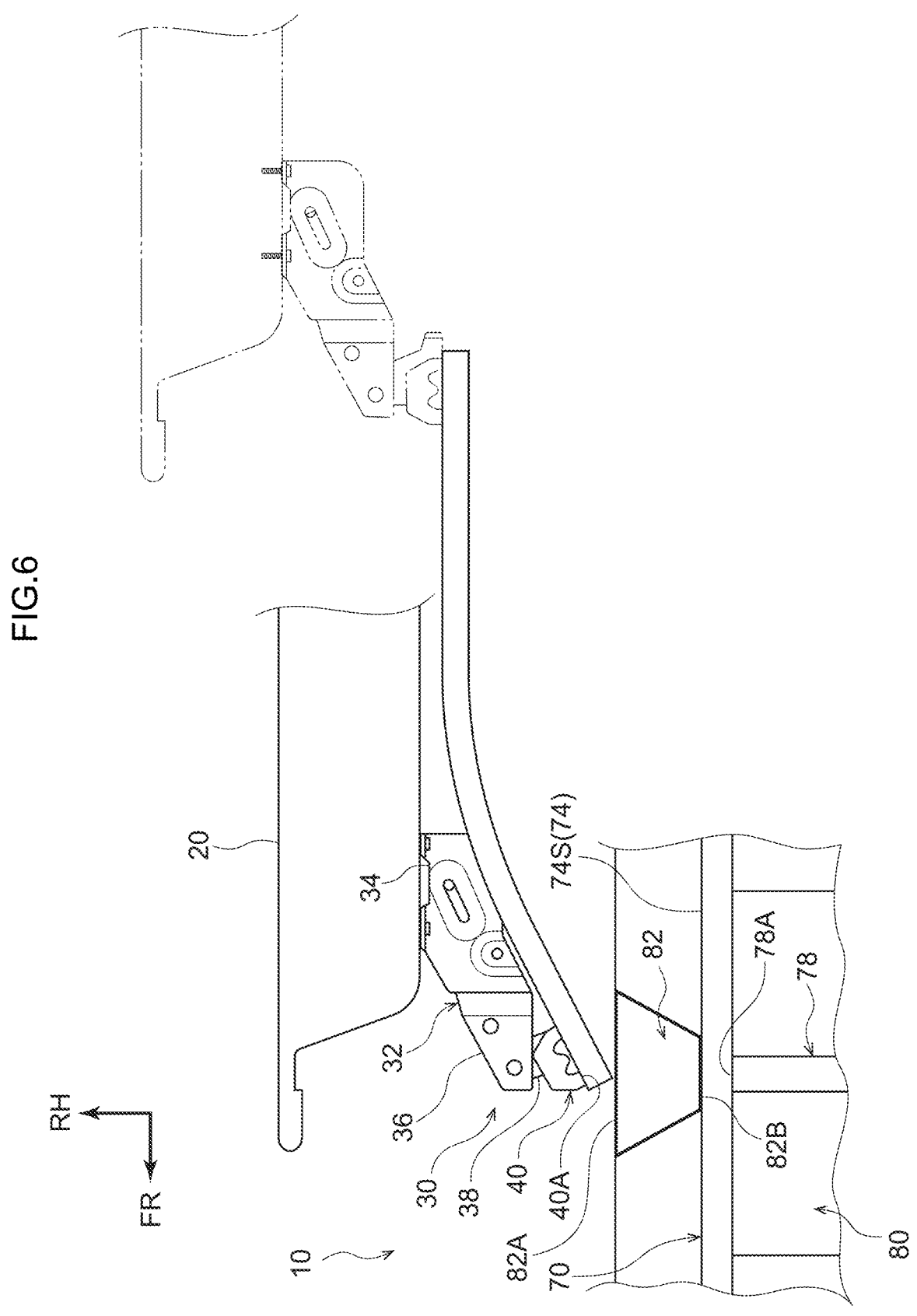
FIG. 6 is a schematic plan view showing a magnification of a portion of the variant example of the vehicle side portion structure according to the present exemplary embodiment.

As shown in FIG. 5 and FIG. 6, in the closed state of the sliding door 20, a spacer 82 may be disposed between at least the vehicle width direction inner side end portion 40A of the base portion 40 of the lower hinge 30 and the side portion 74S of the battery case 70. In this structure, a penetrating hole may be formed in a predetermined portion of the first vertical wall portion 52B such that the spacer 82 may be disposed therein.

The spacer 82 is fabricated of a resin such as, for example, polyamide (PA), polycarbonate (PC) or the like (fabricated of engineering plastic), and features a degree of stiffness. The spacer 82 is formed in a substantially trapezoid shape in plan view. That is, a length in the front-and-rear direction of an outer side face 82A of the spacer 82 opposing the vehicle width direction inner side end portion 40A of the base portion 40 is longer than a length in the front-and-rear direction of an inner side face 82B of the spacer 82 opposing the side portion 74S of the battery case 70.

When the spacer 82 is provided in this shape, even when the position of the vehicle width direction inner side end portion 40A of the base portion 40 is a little offset in the front-and-rear direction relative to the vehicle width direction outer side end portion 78A of the dividing member 78 in plan view, a collision load may be transmitted through the spacer 82 from the vehicle width direction inner side end portion 40A of the base portion 40 to the vehicle width direction outer side end portion 78A of the dividing member 78.

That is, even though the position of the vehicle width direction inner side end portion 40A of the base portion 40 is a little offset in the front-and-rear direction from the vehicle width direction outer side end portion 78A of the dividing member 78 in plan view, transmission of a collision load from the vehicle width direction inner side end portion 40A of the base portion 40 to the battery stack 80 (the battery cells) may be made less likely. Thus, interference of the vehicle width direction inner side end portion 40A of the base portion 40 of the lower hinge 30 with the battery stack 80 (the battery cells) accommodated inside the battery case 70 may be inhibited.

Hereabove, the vehicle side portion structure 10 according to the present exemplary embodiment has been described in accordance with the attached drawings. However, the vehicle side portion structure 10 according to the present exemplary embodiment is not limited to the illustrated structures: suitable design modifications may be applied within a scope not departing from the gist of the present disclosure. For example, the spacer 82 may be fabricated of metal.

Further, a protrusion portion (not shown in the drawings) that protrudes to the vehicle width direction outer side in plan view may be formed integrally at the side portion 74S of the battery case 70, such that the protrusion portion is functionally equivalent to the spacer 82. The spacer 82 is not limited to the trapezoid shape shown in the drawings, as long as the spacer 82 may efficiently transmit a collision load from the vehicle width direction inner side end portion 40A of the base portion 40 to the vehicle width direction outer side end portion 78A of the dividing member 78.

What is claimed is:

1. A vehicle side portion structure comprising:
   a battery case disposed at a vehicle lower side of a floor panel of a vehicle, the battery case accommodating a battery stack therein and including a dividing member that extends in a vehicle width direction; and
   a lower hinge provided at a lower portion of a sliding door that opens and closes a side portion of the vehicle, the lower hinge supporting the sliding door to be slidable in a vehicle front-and-rear direction, and, when the sliding door is closed, at least a vehicle width direction inner side end portion of the lower hinge being disposed at a vehicle width direction outer side of the battery case in an elevation view,
   wherein, when the sliding door is closed, the vehicle width direction inner side end portion of the lower hinge is disposed at a same position in the vehicle front-and-rear direction as a vehicle width direction outer side end portion of the dividing member in a plan view.

2. The vehicle side portion structure according to claim 1, wherein, when the sliding door is closed, a spacer is disposed between the vehicle width direction inner side end portion of the lower hinge and the battery case.

3. The vehicle side portion structure according to claim 2, wherein a length in the vehicle front-and-rear direction of an outer side face of the spacer opposing the vehicle width direction inner side end portion of the lower hinge is longer than a length in the vehicle front-and-rear direction of an inner side face of the spacer opposing the battery case.

* * * * *